(12) United States Patent
Korpela et al.

(10) Patent No.: US 7,724,720 B2
(45) Date of Patent: *May 25, 2010

(54) METHOD FOR TRANSMITTING A SEQUENCE OF SYMBOLS

(75) Inventors: Sari Korpela, Espoo (FI); Janne Koivisto, Turku (FI); Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/457,879

(22) Filed: Jul. 17, 2006

(65) Prior Publication Data

US 2006/0245409 A1  Nov. 2, 2006

Related U.S. Application Data

(63) Continuation of application No. 10/030,286, filed as application No. PCT/FI00/00620 on Jul. 6, 2000.

(30) Foreign Application Priority Data

Jul. 9, 1999 (FI) .................................. 991589

(51) Int. Cl.
- *H04B 7/216* (2006.01)
- *H04B 7/10* (2006.01)
- *H04J 3/06* (2006.01)
- *H04J 3/24* (2006.01)
- *H03C 7/02* (2006.01)
- *H04M 1/00* (2006.01)

(52) U.S. Cl. ............... 370/342; 370/474; 370/503; 455/101; 455/562.1; 375/347

(58) Field of Classification Search ................ 370/335, 370/342, 336, 328, 329; 375/260, 267, 347, 375/295; 455/562.1, 101
See application file for complete search history.

(56) References Cited

U.S. PATENT DOCUMENTS

| | | | |
|---|---|---|---|
| 4,965,796 A * | 10/1990 | Petty | 370/538 |
| 6,052,661 A * | 4/2000 | Yamaura et al. | 704/222 |
| 6,185,258 B1 * | 2/2001 | Alamouti et al. | 375/260 |
| 6,430,231 B1 * | 8/2002 | Calderbank et al. | 375/295 |
| 6,600,934 B1 * | 7/2003 | Yun et al. | 455/562.1 |
| 6,690,712 B2 * | 2/2004 | Kim et al. | 375/146 |
| 6,804,311 B1 * | 10/2004 | Dabak et al. | 375/347 |
| 6,807,147 B1 * | 10/2004 | Heinonen et al. | 370/208 |
| 6,853,689 B1 * | 2/2005 | Nilsson | 375/267 |
| 7,012,906 B1 * | 3/2006 | Song | 370/335 |

* cited by examiner

*Primary Examiner*—Nittaya Juntima
(74) *Attorney, Agent, or Firm*—Perman & Green LLP

(57) ABSTRACT

A method transmits a certain sequence of symbols, where a frame is constructed of a certain number of consecutive symbols. The symbols belonging to the sequence are transmitted using at least two antennas and the transmission of the sequence of symbols is with a certain transmission pattern. The transmission of the sequence of symbols is started from a predefined antenna and the transmission pattern is started from the beginning in the beginning of each frame. Also disclosed is an apparatus and a network element for controlling the transmission of a sequence of symbols.

18 Claims, 6 Drawing Sheets

METHOD FOR TRANSMITTING A SEQUENCE OF SYMBOLS

CROSS-REFERENCE TO RELATED APPLICATIONS

The present application is a continuation application of prior U.S. application Ser. No. 10/030,286, filed Jan. 7, 2002 which is based upon International application No. PCT/FI00/00620, filed Jul. 6, 2000, which in turn is based upon Finnish application No. 991589, filed Jul. 9, 1999, all of which applications are hereby incorporated by reference. The priority of all said applications is hereby claimed.

BACKGROUND OF THE INVENTION

1. Field of the Invention

The invention relates in general to transmission of a certain sequence of symbols. In particular the invention relates to diversity transmissions where the symbols belonging to the sequence are sent using at least two antennas.

2. Brief Description of Related Fields

In cellular networks the downlink and uplink radio transmissions comprise synchronization channels, which can be special synchronization symbols. Using the information carried in the synchronization symbols, for example, the receiver can determined the timing of the transmission. Information is usually sent in frames, and the frames consist of a certain number of time slots. The time slots, in turn, consist of a certain number of symbols. If synchronization symbols are used, they can be sent, for example, once in each time slot. It is also possible to send synchronization information in bursts, so that more information is sent at a time, but synchronization information is sent less frequently than once in a time slot. From the synchronization information it is possible to determine both the time slot timing and the frame timing, i.e. where time slots and frames start.

The synchronization symbols may carry also other information than just indicate timing. For example, in Wideband Code Division Multiple Access (WCDMA) cellular networks the synchronization symbols carry certain information about the spreading code that a base station uses to spread the downlink transmissions. In a handover, for example, the mobile station entering a new cell can determine the part of the downlink spreading code with the help of the synchronization symbols. The mobile station needs to know the spreading code in order to find out the control information transmitted via the common control channel. Otherwise it cannot, for example, communicate with the radio access network after power up or in a handover situation receive from the new cell cell-specific control information that is needed to perform the handover.

Traditionally information is transmitted over radiolink using a single antenna. Transmission diversity refers to sending information via more than one antenna. The transmitted information can be, for example, encoded so that the transmitted symbol flows are not equal, but the original information flow can be determined from each transmitted symbol flow. The receiver can, for example, choose special decoding scheme in case transmission diversity is used and deduce the transmitted information. The synchronization symbols can carry information also about the use of some transmission diversity scheme. It is important that the receiver can determine the sent synchronization symbol correctly. Otherwise, for example, it may fail to identify the transmission diversity and encoding schemes that are used.

FIG. 1 represents a typical WCDMA cell 100, where there is a base station 101 in the middle of the cell. There are also two mobile stations 102 and 103 in the FIG. 1, and the communication between each mobile station and the base station is indicated with arrows. The base station broadcasts common control information to all the mobile stations in the cell, and it spreads this common control information with a certain spreading code. In a WCDMA system, a spreading code usually consists of two parts: a long scrambling code $C_S$ and a short channelization code $C_C$. The scrambling code is effective to eliminate, for example, the effect of multipath propagation. The channelization codes that are used within a cell are orthogonal, and they are effective to distinguish, for example the transmission to each mobile station. In a WCDMA system, within a cell a same scrambling code $C_S$ may be used for all downlink transmissions. The downlink transmission are synchronized, and therefore the different channelization codes are enough for successful despreading of the transmitted signals. In the neighboring cells, other scrambling codes are used so that adjacent cells do not disturb each other's transmissions.

The use of spreading codes in downlink transmission is presented in FIG. 1, where the arrow 111 represents the common control information broadcast. The spreading code can be presented as the product of the scrambling and channelization codes $C_{CC}=C_S C_C$. When entering a new cell, the mobile station can determine the downlink scrambling code $C_S$ from the broadcast transmission the base station sends. The channelization code related to common control information is typically a fixed constant throughout the WCDMA system, so after determining the downlink scrambling code and the frame timing, the mobile station can determine the common control information.

The arrow 112 in FIG. 1 represents the downlink transmission to the mobile station 102, and the arrow 113 represents the downlink transmission to the mobile station 103. The spreading code $C_{D1}$ for the downlink connection to the mobile station 102 is $C_{D1}=C_S C_{C1}$, and the spreading code $C_{D2}$ for the downlink connection to the mobile station 103 is $C_{D2}=C_S C_{C2}$. Since the uplink transmissions are not synchronized and each mobile has its own radio channel from the mobile station to the base station, each mobile station may use a specific scrambling code, and various channels, for example, to a certain mobile station may be separated using various channelization codes. The downlink and uplink spreading codes for connections terminating to a mobile station are usually established either when a mobile station enters a new cell or when a new connection is established between the mobile station and the radio access network.

FIG. 2 shows some of the common channels a base station in a WCDMA system generally transmits The pilot symbols are transmitted over a common pilot channel (CPICH) 201. The pilot symbols are usually sent 100% of the duty cycle. The pilot symbols are predetermined, and CPICH is spread using the downlink scrambling code $C_S$ and a fixed channelization code.

The synchronization channel (SCH) 202 occupies typically 10% of the duty cycle in the beginning of each time slot 210. The frame 211, which comprises a certain fixed number of time slots, is also presented in FIG. 2. The synchronization channel carries two synchronization codes: a primary synchronization code 203 and a secondary synchronization code 204. These codes are transmitted simultaneously within one symbol period. Both the primary and secondary synchronization codes can be modulated, for example, with the same symbol, and because the codes have good crosscorrelation properties the receiver can distinguish the codes. A mobile station entering a new cell or measuring a new cell in the neighborhood may always receive successfully information broadcast over the SCH.

The primary synchronization code is a constant code that denotes the beginning of the time slots. The secondary synchronization codes, which form a synchronization code sequence or word, indicate the timing of the frames. In addition to the frame timing, the second synchronization code sequence within a frame indicates the scrambling code group to which the downlink scrambling code the base station uses belongs. A mobile station entering a new cell may determine the downlink scrambling code, for example, by testing the scrambling codes of the indicated scrambling code group on the CPICH. The correct scrambling code $C_S$ is the one that with the known channelization code produces from the received radio signal the known transmitted pilot symbols.

Once the scrambling code $C_S$ has been determined, the received pilot symbols may be used, for example, for determining the complex channel coefficient. In general, the radio signal that is received is not exactly the same as the transmitted one. The signal may experience changes in amplitude and phase, and these changes are time-dependent. They are taken into account using the complex channel coefficient h when the despread signal is processed. An estimate $\hat{h}$ for the channel coefficient can be determined by comparing the received pilot symbols to the known transmitted pilot symbols. The channel coefficient may be assumed to be constant during the time over which the pilot symbol and the studied symbol are transmitted.

Common control information is transmitted using, for example, a Primary Common Control Physical Channel (PC-CPCH) 205. PCCPCH is transmitted 90% of the duty cycle, at the time when the synchronization symbols are not sent. It is spread using a predetermined channelization code and the downlink scrambling code, as discussed above. After the scrambling code has been identified, the mobile station may despread the CCPCH information from the spread signal it receives. The information may be, for example, information related to the logical Broadcast Control Channel (BCCH). The mobile station needs the BCCH information, for example, to start communicating with the radio access network after power up or to make a successful handover.

FIG. 2 represents a situation where the base station uses only one antenna TX1 for broadcasting information. When transmission diversity is employed, there are at least two antennas where the information may be transmitted. It is preferable that each antenna transmits its own pilot signal, so that the channel coefficient estimates can be determined for each antenna. The radio waves emitted for the two transceivers may propagate in different ways to the antenna of the mobile station.

FIG. 3 represents some broadcast channels when transmission diversity and two antennas TX1 and TX2 are in use. The antenna TX1 transmits the common pilot channel CPICH 201 similarly as when no transmission diversity is employed. The antenna TX2 transmits an auxiliary pilot 301. The synchronization symbols may be transmitted using only one antenna or both antennas. In time switched transmit diversity (TSTD) both antennas are used to transmit the symbols, one at a time. FIG. 3 shows how the synchronization symbols are transmitted using TSTD and an alternating transmission pattern. For example, the synchronization symbol 302 is transmitted from the antenna TX1 and the synchronization symbol 303 is transmitted from the antenna TX2. Each synchronization symbol carries both the primary and the secondary synchronization code.

The common control information may be also transmitted from both antennas TX1 and TX2. In this case the BCCH information, for example, is encoded before it is transmitted over the PCCPCH channel. Space time transmit diversity (STTD), for example, specifies that from the primary antenna TX1 the symbols are transmitted as such, i.e. the sequence of transmitted symbols is $S_1, S_2, S_3, S_4, \ldots$. From the second antenna TX2 the sequence of transmitted symbols starts in the following way: $-S_2^*, S_1^*, -S_4^*, S_3^*, \ldots$, where the asterisk indicates the complex conjugate. FIG. 3 presents the PCCPCH data 304 transmitted from the antenna TX1 and the PCCPCH data 305 transmitted from the antenna TX2. It is possible also to use the space time transmit diversity for the BCCH information but transmit all the synchronization symbols from one antenna.

The base station may indicate the use of a diversity scheme and two transceivers, for example, by transmitting a specific message on a broadcast channel or modulating the synchronization symbols. A certain synchronization symbol value indicates that the STTD is on, and another value indicates that it is off. The mobile station may also determine the use of a diversity scheme by detecting the auxiliary pilot symbols. The mobile station may also use all three indicators of the diversity scheme.

When the mobile station detects the presence of STTD using the synchronization symbol, the value of the synchronization symbol needs to be determined reliably. When a certain symbol needs to be determined, the effect of the channel coefficient has to be taken into account. The mobile station receives the following signal r $$r = h s_{SCH} + n$$

where h represents the complex channel coefficient, $s_{SCH}$ represents the synchronization symbol and n represent the noise.

When the received signal r in multiplied by the complex conjugate of the channel coefficient estimate $\hat{h}^*$ $$\hat{h}^* r = \hat{h}^*(h s_{SCH} + n) = \hat{h}^* h s_{SCH} + \hat{h}^* n$$

the result is the synchronization symbol scaled with a scalar $\hat{h}^* h$ and the term related to noise. From here it is quite straightforward to infer the value of the synchronization symbol.

Above, the synchronization symbols have been used as an example of a sequence of symbols that is transmitted using two antennas. The problem is that when the TSTD diversity scheme is in use, the mobile station cannot necessarily distinguish from which antenna a certain synchronization symbol, or any other symbol that is transmitted using a time switched diversity scheme, is transmitted. Consider, for example, a situation where a certain sequence of symbols is transmitted once is every time slot, and a frame consists of an odd number of time slots. If the symbols belonging to the sequence are transmitted using a time switched diversity scheme, two diversity antennas are used and the transmission pattern is an alternating pattern, in a certain time slot the symbol belonging to the sequence is transmitted from one antenna in every other frame and in the rest of the frames from the other antenna. Therefore the mobile station does not know, which channel coefficient estimate to use for a symbol sent in a certain time slot with a time switched transmission scheme.

To obtain a reliable result, the signal transmitted by the primary transceiver has to be processed with the channel coefficient estimate $\hat{h}_2$ determined from the primary pilot and the signal transmitted by the secondary transceiver has to be processed with the channel coefficient estimate $\hat{h}_2$ determined from the auxiliary pilot. Not knowing from which antenna a certain symbol is transmitted causes unnecessary interference to the decision determining which symbol was sent. In case of synchronization symbols, this may cause that the mobile station cannot utilize the transmission diversity of, for example, the common control information for enhancing the quality of the received signal. Consequently, if the transmission diversity is in use, but the receiver does not notice this, the quality of the received common control signal may be poorer than in a case where no transmission diversity is applied.

The object of the invention is to provide a versatile method for transmitting a sequence of symbols using at least two antennas. A further object of the invention is that the method enables to determine unambiguously from which antenna a symbol belonging to sequence is transmitted.

The objects of the invention are achieved by starting the time switched transmit diversity pattern of the sequence of symbols always from the same antenna in the beginning of a frame and by using the same pattern in each frame.

BRIEF SUMMARY OF THE INVENTION

A method according to the invention is a method for transmitting a certain sequence of symbols, where
a frame is constructed of a certain number of consecutive symbols,
the symbols belonging to the sequence are transmitted using at least two antennas and
the transmission of the sequence of symbols is characterized with a certain transmission pattern, and it is characterized in that
the transmission of the sequence of symbols is started from a predefined antenna and
when a partial transmission pattern is used in the end of a frame, the transmission pattern is started from the beginning in the beginning of a next frame.

An arrangement according to the invention is an arrangement, which comprises control means for controlling the transmission of a sequence of symbols according to a certain transmission pattern and using at least two antennas, and it is characterized in that it further comprises
indication means for indicating the antenna from which to transmit the first symbol belonging to the sequence and
starting means for starting the transmission pattern from the beginning in the beginning of a next frame, when a partial transmission pattern is used in the end of a frame.

A network element according to the invention is a network element, which comprises control means for controlling the transmission of a sequence of symbols according to a certain transmission pattern and using at least two antennas, and it is characterized in that it further comprises
indication means for indicating the antenna from which to transmit the first symbol belonging to the sequence and
starting means for starting the transmission pattern from the beginning in the beginning of a next frame, when a partial transmission pattern is used in the end of a frame.

In a method according to the invention a sequence of symbol is transmitted using at least two antennas. The transmission of the symbols belonging to the sequence is characterized with a transmission pattern. Here the term transmission pattern refers to a pattern that specifies both from which antenna a symbol is transmitted and at which time the symbol is transmitted. The pattern may consist, for example, of a sequence of pattern items, and each of the pattern items corresponds to a certain period of time. A pattern item may be represented, for example, by a number indicating an antenna. For example, a pattern 1, 2, 0, 2, 2, 0, 1, . . . , where each number corresponds to a time slot, would indicate that a first symbol of the sequence is transmitted in a first time slot using a first antenna, a second symbol of the sequence is transmitted using a second antenna in a second time slot and in the third time slot no symbol belonging to the sequence is transmitted. In the fourth time slot, a third symbol of the sequence is transmitted using the second antenna, and so forth.

In the method according to the invention the antenna to transmit the first symbol belonging to the sequence is predefined. This means that a certain physical antenna is associated to the first antenna of the transmission pattern. The receiver thus knows which of the pilot signals is transmitted by the same antenna as the first symbols of the sequence, and it may use the correct channel coefficient estimate in processing the first symbol of the sequence. If, for example, the first symbol of the sequence is transmitted using the primary antenna that transmits the common pilot, the channel coefficient estimate determined from the common pilot is used to process the received first symbol.

Further, in the method according to the invention, the transmission pattern is started from the beginning in the beginning of each frame. Even if the receiver starts to receive the signal in the middle of the transmission, it knows explicitly that in each frame the first symbol belonging to the sequence is transmitted using a predefined antenna, for example, the primary antenna.

The advantage of the method according to the invention is thus that the receiver knows for certain at least the antenna from which in each frame the first symbol belonging to the symbol sequence is transmitted. It may thus process at least these symbols with the correct channel coefficient estimate. This removes unnecessary interference in the decision process where the received symbol is determined. When the method according to the invention is in use, at least some of the symbols of the sequence can thus be received reliably.

Usually the receiver knows the transmission pattern, and if two antennas are used to transmit the symbol sequence, the information from which antenna the first symbol in each frame is transmitted reveals the transmission antennas of all the symbols in that frame. A further advantage of the invention is thus that in a case where two diversity antennas are used and the receiver knows the transmission pattern, the receiver can process all received symbols belonging to the sequence with correct channel coefficient estimations and determine the received symbols reliably.

If more than two diversity antennas are in use, the method according to the invention can be applied, too. If n diversity antennas are in use and at least n−1 antennas in the transmission pattern are associated to physical antennas, then a receiver who knows the transmission pattern, can use correct channel coefficient estimation for all the received symbols belonging to the sequence and determine their values reliably.

BRIEF DESCRIPTION OF THE DRAWINGS

The invention will now be described more in detail with reference to the preferred embodiments by the way of example and to the accompanying drawings where.

Above in conjunction with the description of the prior art reference was made to FIGS. 1-3. The same reference numerals are used for corresponding parts in the figures.

DETAILED DESCRIPTION OF THE INVENTION

Figure 1:
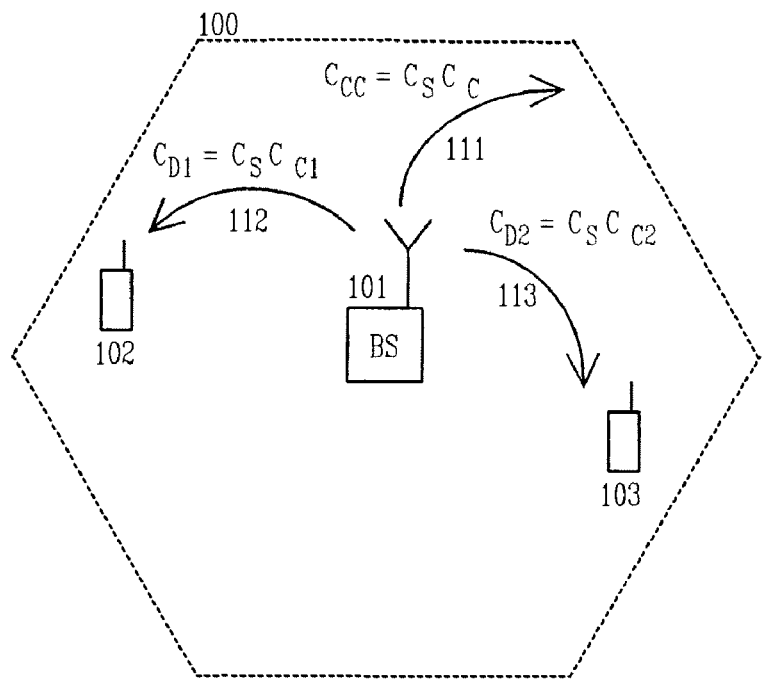
FIG. 1 shows a schematic drawing of a base station communicating with two mobile terminals in WCDMA system.
Figure 2:
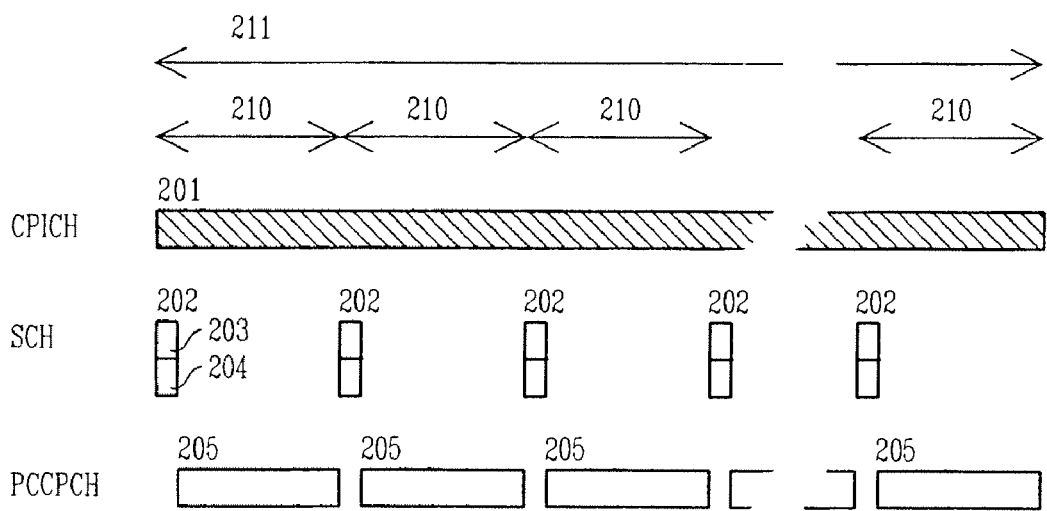
FIG. 2 shows a schematic drawing of some of the common broadcast channels in WCDMA system.
Figure 3:
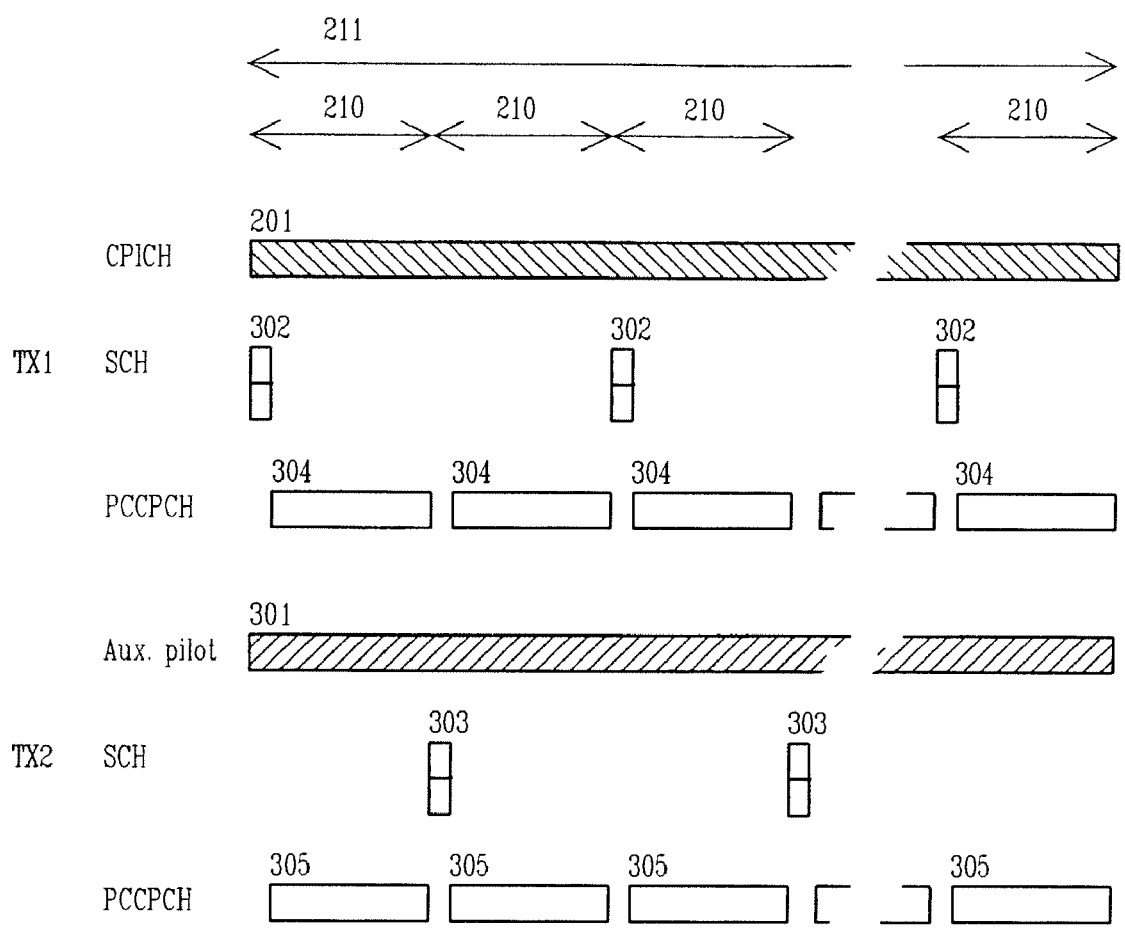
FIG. 3 shows a schematic drawing of some of the common broadcast channels in WCDMA system when transmission diversity is in use.
Figure 4:
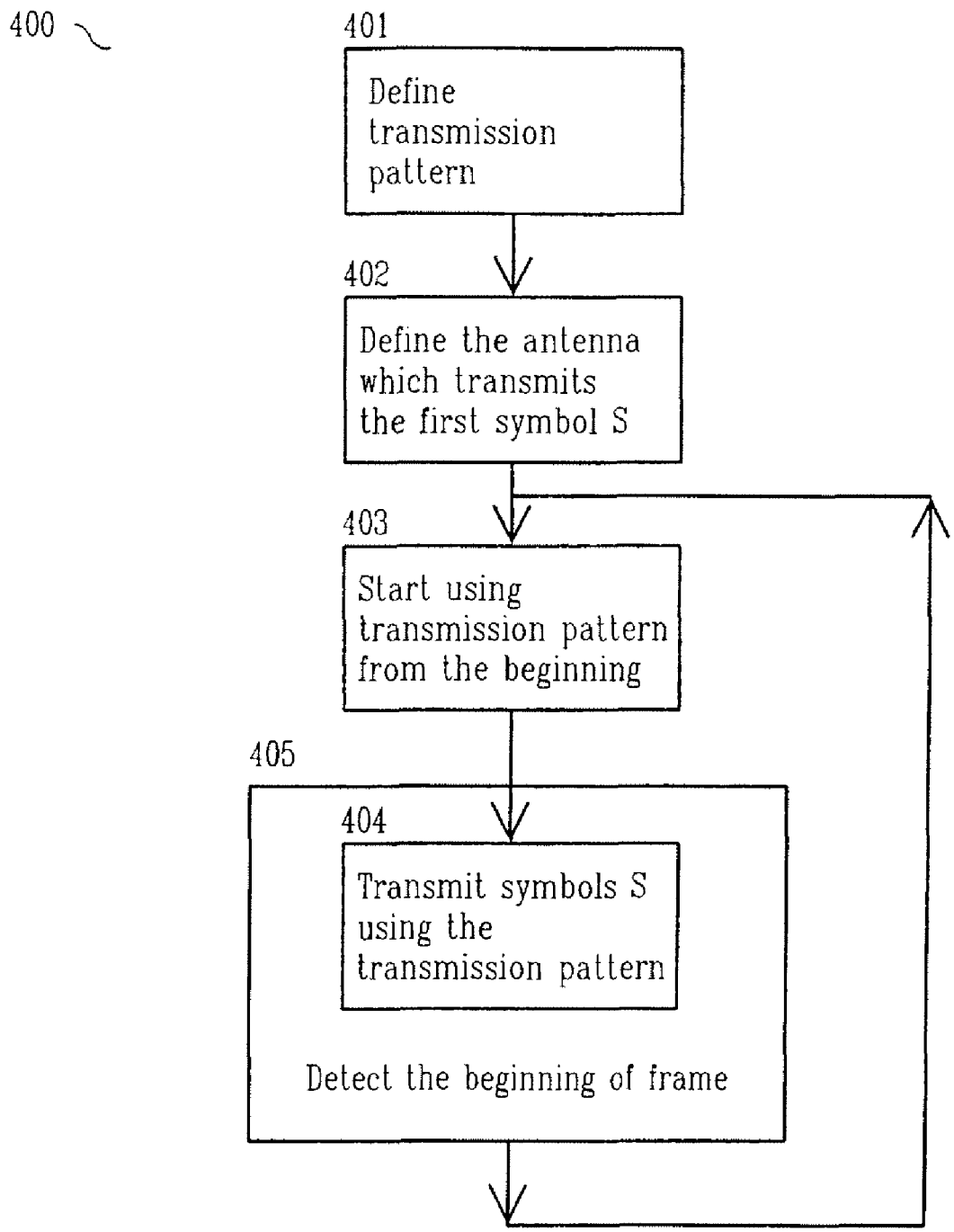
FIG. 4 shows a flowchart of method according to a first preferred embodiment of the invention.

FIG. 4 shows a flowchart of a method 400 according to a first embodiment of the invention. A sequence of symbols is transmitted using a specified transmission pattern. The symbols belonging to the sequence are marked with S. In step 401 the transmission pattern that characterizes the transmission of a certain sequence of symbols is defined. In step 402 the antenna which transmits the first symbol S of the sequence is defined. Thereafter the actual transmission of symbols S belonging to the sequence begins.

In step 403 the transmission pattern is reset, so that the next symbol S of the sequence is transmitted according to the first item of the transmission pattern. In step 404 symbols of the sequence are transmitted according to the transmission pattern. Step 405 is carried out simultaneously with the transmission in step 404, and when the beginning of a new frame is detected in step 405, the transmission pattern is reset in step 403 and the next symbol S of the sequence is transmitted as the first item of the transmission pattern specifies.

Because the transmission pattern specifies the time at which the symbols S are sent, the length of the transmission pattern can be measured in units of time. The length of the transmission pattern can be expressed, for example, in time slots. If the transmission pattern is longer than a frame, then in a method according to this first preferred embodiment of the invention only a certain number (corresponding to the length of a frame) of items in the beginning of the transmission pattern is used. If the transmission is shorter than a frame, then symbols S are transmitted only in the first part of the frame in a method according to the first preferred embodiment of the invention.

In a method according to the first embodiment of the invention, in each frame a same number of symbols S is transmitted. The first of these symbols S within a frame is always sent using the predefined antenna. In fact, each of the symbols S within a frame in the consecutive frames are transmitted using a certain antenna. The symbols S are thus transmitted similarly in each frame (although the values of the symbols, for example in certain time slots in consecutive frames, need not be same).

Figure 5:
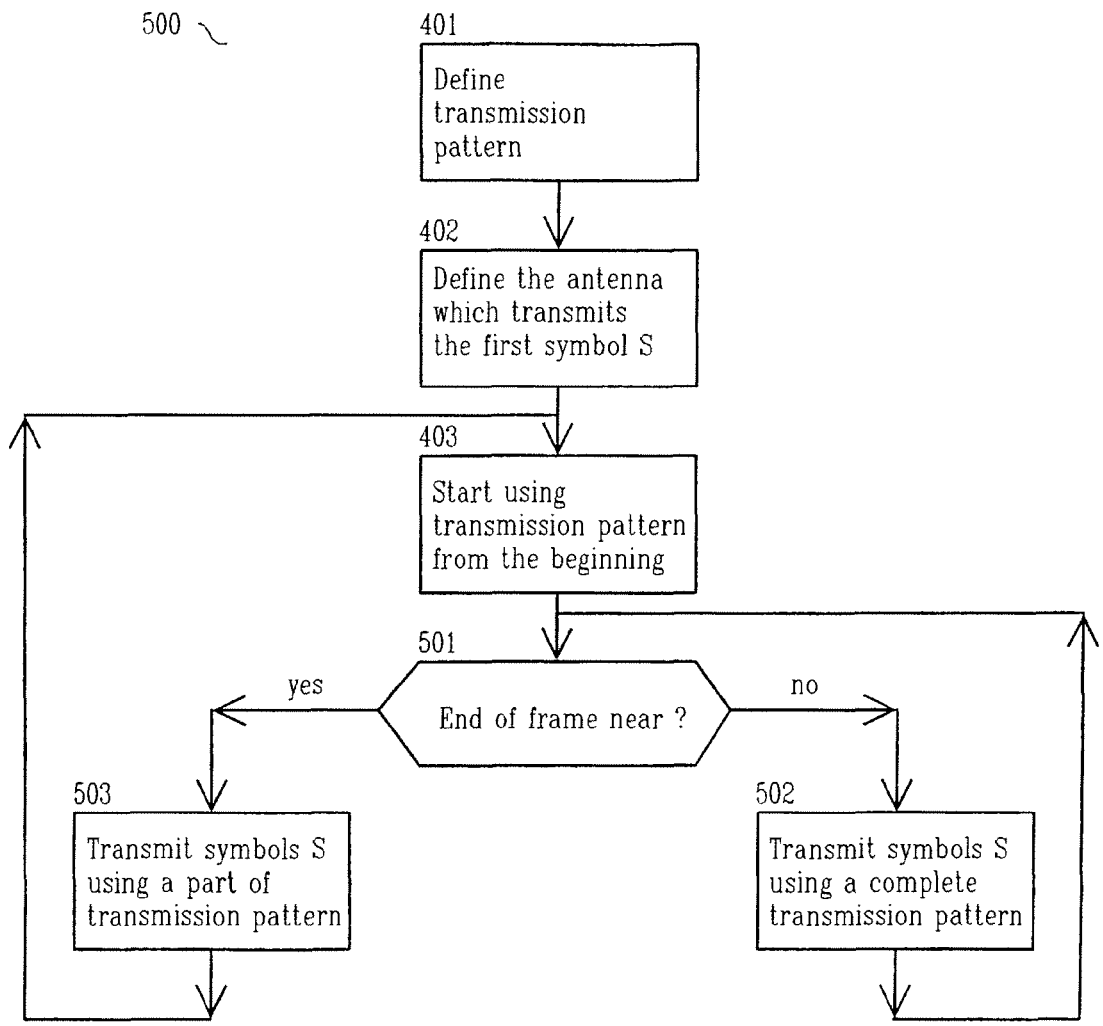
FIG. 5 shows a flowchart of method according to a second preferred embodiment of the invention.

FIG. 5 shows a flowchart of a method 500 according to a second preferred embodiment of the invention. In this method, if the length of the transmission pattern is shorter than a frame, the transmission pattern is repeated in a certain way. This ensures that the symbols S of the sequence are transmitted during the whole frame.

The method 500 begins similarly as the method 400 according to the first preferred embodiment of the invention. In step 401 the transmission pattern is defined and in step 402 the antenna which transmits the first symbol S of the sequence. In step 403 the transmission pattern is started from the beginning.

In step 501 it is checked, if the length of the rest of the frame is longer than or equal to a complete transmission pattern. If it is, then in step 502 symbols S are transmitted using the complete transmission pattern, and thereafter the length of the rest of the frame is checked again. In this method, the transmission pattern is thus repeated during a frame as many times as it can be repeated completely.

When the end of the frame is near, i.e. the length of the rest of the frame is less than the length of the transmission pattern, then in step 503 symbols S are transmitted using only a certain part of the transmission pattern. The length of this part is equal to the remainder of the length of a frame divided by the length of the transmission pattern. Thereafter the transmission pattern is started from the beginning in step 403, and symbols S are again transmitted using the complete transmission pattern in step 502. The part of the transmission pattern can be selected, for example, from the beginning of the pattern.

The advantage of this method according to the second preferred embodiment of the invention is that even if the transmission pattern is shorter than a frame and the length of a frame is not a multiple of the transmission pattern, it is possible to transmit symbols S of the sequence throughout a frame by repeating the transmission pattern and be certain that in each frame the symbols S of the sequence are transmitted using the diversity antennas similarly.

This method works also if the length of the transmission pattern is longer than the frame. In that case step 502 is never entered, and only a certain part of the transmission pattern is used in sequential steps 503.

Figure 6:
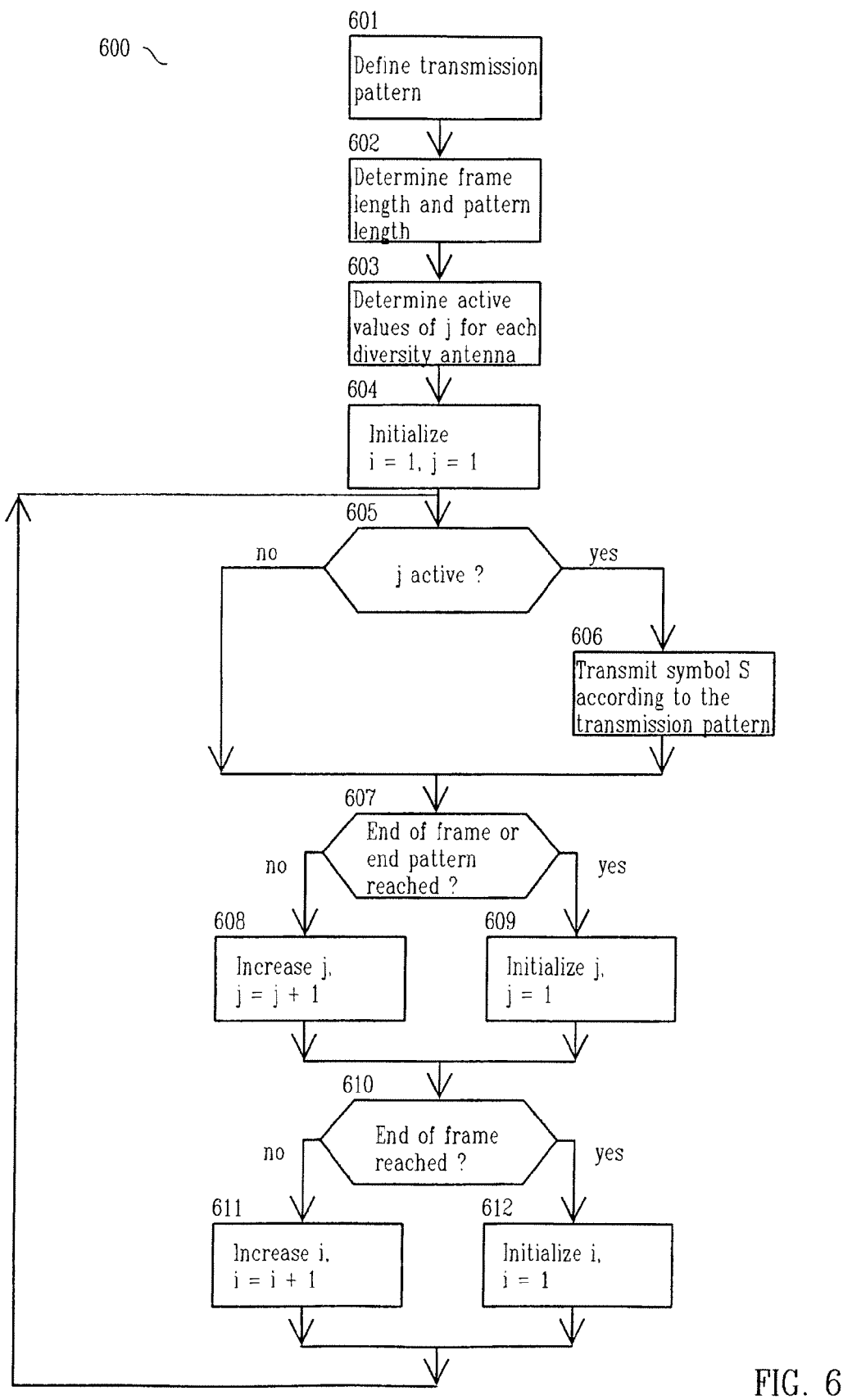
FIG. 6 shows a flowchart of a method according to a third preferred embodiment of the invention and FIG. 7 shows a schematic drawing of a network element and an arrangement that employ a method according to the invention.

FIG. 6 shows a more detailed flowchart of a transmission method 600 according to a third preferred embodiment of the invention. In this method, the diversity antenna that transmits the first symbol of the sequence is also specified, although this is not shown in FIG. 6. In this method, if the transmission pattern is short, it is repeated within a frame similarly as in method 500. The part of the transmission pattern, which is placed to the end of each frame, is selected here from the beginning of the transmission pattern.

In step 601 the transmission pattern is defined. In step 602 the length of the frame and the length of the transmission pattern are determined. In the method, the index j is used to denote the items of the transmission pattern, and in step 603 the active indexes for each antenna are determined from the transmission pattern. An active index refers here to those transmission pattern items during which a symbol S is transmitted using a certain antenna. Consider on example, where transmission pattern is a simple alternating pattern and two diversity antennas are used. If one symbol S is transmitted, for example, in the beginning of each time slot, then the transmission pattern items correspond to a time slot. The transmission pattern can be represented, for example, with two numbers 1 and 2. The odd values of j are active for one antenna and the even values of j for the other antenna. If in a certain time slot of a pattern no symbol S is transmitted, then the respective value of j is not active for any antenna. Similarly, if in a certain time slot of a pattern both antennas are transmitting a symbol S, then the respective value of j is active for both antennas.

Index j runs from 1 to the length of the transmission pattern. The length of the transmission pattern may be expressed, for example, in symbols or in time slots.

In step 604 the value of index j is initialized to one. In the same step 604 index i, which refers to time units of a frame, is also initialized to one. Index i has to refer to a same time unit as index j. If n>1 symbols S can be transmitted in each time slot, then the index i may run, for example, from 1 to n times the number of time slots in a frame. In this case, the length of the transmission pattern would also be expressed in n'th parts of a time slot.

In step 605 it is checked, if the current value of j is active, i.e. if any of the diversity antennas is expected to transmit a symbol S in the current time unit. If j is active, then in step 606 the antenna(s) specified by the transmission pattern transmits the symbol S. After transmission, in step 607 it is checked, if the end of frame or end of pattern has been reached. If j is not active, then this checking is done directly after step 605. If either the end of frame or the end of the pattern has been reached, then the transmission pattern is started afresh by initializing j to 1 in step 609. If the current time unit is in the middle of the frame and the end of the pattern is not reached, then index j is pointed to the next item in the transmission pattern. This takes place in step 608, where j is increased by one.

After index j has been updated in either step 608 or 609, in step 610 it is checked, if the end of the frame has been reached, i.e. if index i has reached its maximum value. If the end of the frame has been reached, then in step 612 index i is initialized to one. If the current time slot is in the middle of the frame, then index i is pointed to the next time unit by increasing it by one in step 611. After the value of index i has been updated, it is checked in step 605 if the current item of the transmission pattern is active.

As an example, consider a simple pattern whose length is two time slots and, for example, a synchronization symbol is transmitted once in a time slot. Index j thus has values 1 and 2. Further, consider that the pattern is alternating. The values 1 and 2 of index j may thus directly indicate the diversity antenna used to transmit the synchronization symbol. Using the term active index, this can be expressed by saying that, for example, for the primary diversity antenna the index value 1 is active, and for the auxiliary diversity antenna, the index value 2 is active.

If the length of the frame is m time slots, and m is an odd number, then as long as i<m, steps 608 and 609 are carried out in an alternating manner and the synchronization symbols are transmitted from the two diversity antennas in an alternating manner. The pairs (i, j) in the consecutive transmission steps 606 are (1, 1), (2, 2), (3, 1), (4, 2), . . . (m−2, 1), (m−1, 2).

When index h is increased to value m in step 611, the pair (i, j) has value (m, 1) next time in step 606. Thereafter the check in step 607 results the initialization of j, because i=m indicates the end of the frame. In the consecutive step 612 index h is initialized, and the next time the transmission step 606 is entered, the value of the pair (i, j) is (1, 1). The transmission pattern is thus started afresh, when a new frame is started.

If the transmission pattern is, for some reason, defined to be longer than the frame, steps 607 and 609 take care also in this case that the transmission pattern is started afresh when a frame starts. The end of the transmission pattern is not used.

Figure 7:
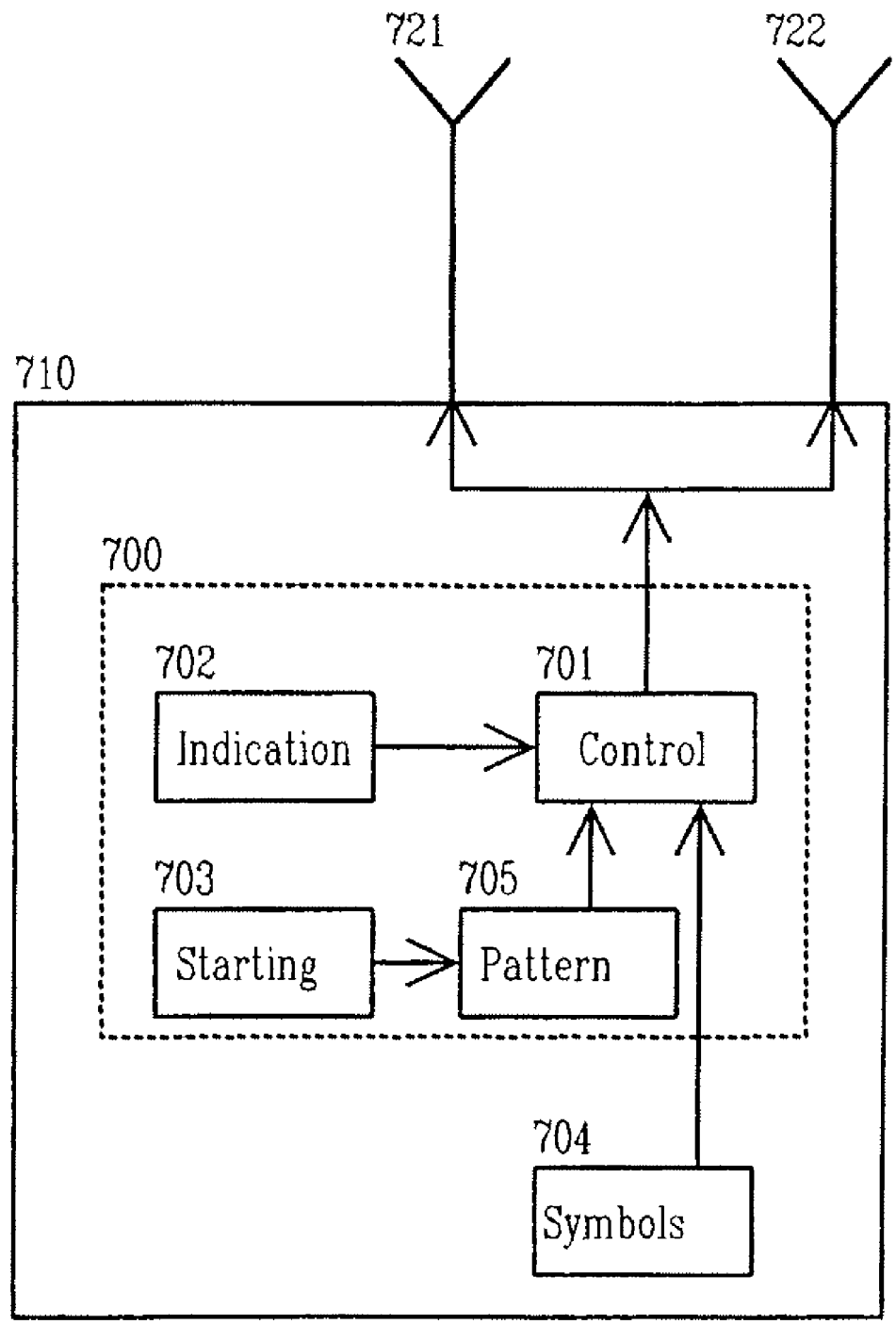

FIG. 7 shows a network element and an arrangement which employ a method according to the invention when they control the transmission of a certain sequence of symbols. The arrangement 700 for controlling the transmission of synchronization symbols comprises a control block 701, which controls the actual transmission of symbols S according to a transmission pattern. It chooses the diversity antenna for each symbol S. The transmission pattern is generated in a generation block 705 and the sequence of symbols S may be generated in the symbol block 704, which is not part of the arrangement 700.

The arrangement 700 comprises also an indication block 702, which is responsible for indicating the antenna being used when the first symbols S of the sequence are transmitted. It also comprises a starting block 703, which, for example, detects the beginning of a frame, and starts the generation of the transmission pattern again from the beginning. The arrangement 700 may use any transmission method according to the invention. The blocks 701-705 may be implemented using, for example, microcontrollers and suitable program code.

The control arrangement can be implemented in the same network element which is responsible for transmitting the sequence of symbols. FIG. 7 shows a network element 710 which in addition to the arrangement 700 comprises two antennas 721 and 722. The arrangement controls the transmission of the symbols S, and the actual transmission is done using the antennas. The network element 710 presented in FIG. 7 may be, for example, a base station of the WCDMA system.

It is also possible to control the transmission of a certain sequence of symbols in another network element than in the one that transmits the symbols. The arrangement 700 can be a part of, for example, the Radio Network Controller (RNC) of the WCDMA system.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

The WCDMA system has been presented as an example of a cellular network where a method according to the invention can be applied. It does not restrict the use of a method according to the invention to WCDMA networks.

Frames and time slots have been used here as examples of the hierarchical structures using which information is transmitted over a radiolink. The names of these structures may vary from system to system and a method according to the invention can be applied in any system where information is transmitted over radiolink in hierarchical structures.

The method according to the invention can be used to transmit any sequence of symbols. The invention does not restrict the type or values of the symbols that are transmitted using a method according to the invention. The sequence may contain, for example, only symbols of one value, as the synchronization symbols in WCDMA system. The sequence may also be, for example, a periodic sequence, where certain symbols are repeated. The length of the period does not have to be any multiple of the pattern length, nor the pattern length need to be any multiple of the sequence period.

The invention claimed is:

1. A method for transmitting a certain sequence of symbols, said method comprising:
   constructing a frame of a certain number of consecutive symbols;
   transmitting the symbols belonging to the sequence using at least two antennas;
   wherein the transmission of the sequence of symbols is with a certain transmission pattern and
   the transmission of the sequence of symbols always starts from a same predefined antenna;
   wherein each symbol of the sequence is transmitted using not more than one antenna, whereby only one antenna is transmitting at one time; and
   starting the transmission pattern from the beginning of a next frame when a partial transmission pattern is used at the end of a frame, said partial transmission pattern starting from the beginning of a transmission pattern and ending before an end of the transmission pattern.

2. A method according to claim 1, wherein:

the length of the transmission pattern is shorter than the length of a frame;

the length of the frame is not a multiple of the length of the transmission pattern; and said method further comprising during each frame:

repeating the transmission pattern until the length is the length of the rest of the frame, which length is the length of the transmission pattern multiplied by the number of the repetition times within the frame subtracted from the length of the frame, is less than the length of the transmission pattern, and thereafter using only a certain part having a length which is the length of the rest of the frame of the transmission pattern.

3. A method according to claim 2, further comprising selecting the part of the pattern from the beginning of the transmission pattern.

4. A method according to claim 2, wherein the length of the transmission pattern is an even number and the length of the frame is an odd number.

5. A method according to claim 4, further comprising transmitting the sequence of symbols using a first antenna and a second antenna, and wherein the transmission pattern is an alternating pattern and the length of the transmission pattern is two.

6. A method according to claim 1, wherein each frame comprises a certain number of consecutive time slots and each time slot comprises a certain number of consecutive symbols, and said method further comprises transmitting one symbol belonging to the sequence of symbols in each time slot.

7. A method according to claim 1, wherein each frame comprises a certain number of consecutive time slots and each time slot comprises a certain number of consecutive symbols, and said method further comprises transmitting more than one symbol belonging to the sequence of symbols in each time slot.

8. A method according to claim 1, wherein each frame comprises certain number of consecutive time slots and each time slot comprises a certain number of consecutive symbols, and said method further comprises transmitting in at least one of the time slots no symbol belonging to the sequence of symbols.

9. A method according to claim 1, wherein the length of the transmission pattern is larger than the length of the frame.

10. A method according to claim 1, further comprising starting the transmission of the sequence of symbols from a primary antenna that transmits a common pilot signal.

11. A method according to claim 1, further comprising transmitting the sequence of symbols in a downlink direction in a cellular network.

12. An apparatus comprising:

a controller for controlling the transmission of a sequence of symbols according to a certain transmission pattern through at least two antennas;

an indicator for indicating an antenna from which to transmit the first symbol belonging to the sequence, wherein a first symbol belonging to a sequence is always transmitted from a same antenna;

an arranger for arranging the transmission of each symbol of the sequence using not more than one antenna, whereby only one antenna is transmitting at a time; and a starter for always starting the transmission pattern from the beginning in the beginning of a next frame when a partial transmission pattern is used at the end of a frame, said partial transmission pattern starting from the beginning of a transmission pattern and ending before an end of the transmission pattern.

13. A network element comprising an apparatus according to claim 12.

14. A network element according to claim 13, wherein said network element comprises a radio network controller of a spread spectrum system.

15. A network element according to claim 13, wherein said network element comprises a base station of a spread spectrum system and at least two antennas.

16. The method of claim 1 wherein starting the transmission of the sequence of symbols from the same predefined antenna further comprises always transmitting a first symbol of a sequence of symbols from the same predefined antenna.

17. The method of claim 16 wherein the transmission pattern defines the predefined antenna from which to always transmit the first symbol of the sequence of symbols.

18. The method of claim 1 wherein a length of the partial transmission pattern is less than a length of a complete frame.

* * * * *